United States Patent [19]
Goddard

[11] Patent Number: 6,053,290
[45] Date of Patent: Apr. 25, 2000

[54] DUAL WEB BRAKE ROTOR

[75] Inventor: Steven Goddard, Fort Wayne, Ind.

[73] Assignee: Dana Corporation, Toledo, Ohio

[21] Appl. No.: 09/100,549

[22] Filed: Jun. 19, 1998

[51] Int. Cl.[7] .................................................. F16D 65/12
[52] U.S. Cl. .......................... 188/218 XL; 188/264 AA
[58] Field of Search ........................ 188/218 XL, 264 A,
188/264 AA, 71.6, 73.2, 18 R, 18 A, 264 R,
58, 59, 218 A; 192/113.2, 113.23, 113.26

[56] References Cited

U.S. PATENT DOCUMENTS

| | | | |
|---|---|---|---|
| 2,745,518 | 5/1956 | Bachman | 188/218 XL |
| 3,394,780 | 7/1968 | Hodkinson | 188/264 A |
| 4,379,501 | 4/1983 | Hagiwara et al. | 188/218 A |
| 4,523,666 | 6/1985 | Murray | 188/218 XL |
| 4,641,731 | 2/1987 | Kawaguchi et al. | 188/218 XL |
| 4,867,284 | 9/1989 | Okamura et al. | 188/218 XL |
| 5,139,117 | 8/1992 | Melinat | 188/218 XL |
| 5,284,230 | 2/1994 | Takaki | 188/218 XL |
| 5,330,034 | 7/1994 | Rancourt et al. | 188/71.6 |
| 5,427,212 | 6/1995 | Shimazu et al. | 188/218 XL |
| 5,509,510 | 4/1996 | Ihm | 188/218 XL |
| 5,526,905 | 6/1996 | Shimazu et al. | 188/218 XL |
| 5,542,503 | 8/1996 | Dunn et al. | 188/218 XL |
| 5,568,846 | 10/1996 | Dagh et al. | 188/218 XL |
| 5,826,685 | 10/1998 | Engle | 188/218 XL |
| 5,878,848 | 3/1999 | Zhang | 188/218 XL |

FOREIGN PATENT DOCUMENTS

| | | | |
|---|---|---|---|
| 1394550 | 5/1964 | France | 188/218 XL |
| 2692951 | 12/1993 | France | 188/58 |
| 846042 | 7/1949 | Germany | 188/264 A |
| 1149126 | 4/1969 | United Kingdom | 188/218 XL |
| 1202904 | 8/1970 | United Kingdom | 188/218 XL |
| 2144186 | 2/1985 | United Kingdom | 188/218 XL |

*Primary Examiner*—Douglas C. Butler
*Attorney, Agent, or Firm*—Oldham & Oldham Co., LPA

[57] ABSTRACT

A disc brake rotor for motor vehicles, having a dual web structural support for connecting a pair of brake discs to a rotor hub that is positioned centrally within the brake rotor without lateral offset. The dual web structural support creates a fanning effect that draws a flow of cooling air between the brake discs. Air flow is further promoted by providing connective ribs located between the brake discs with a shape that produces a pressure drop across the discs and thereby draws cooling air between the discs.

8 Claims, 3 Drawing Sheets

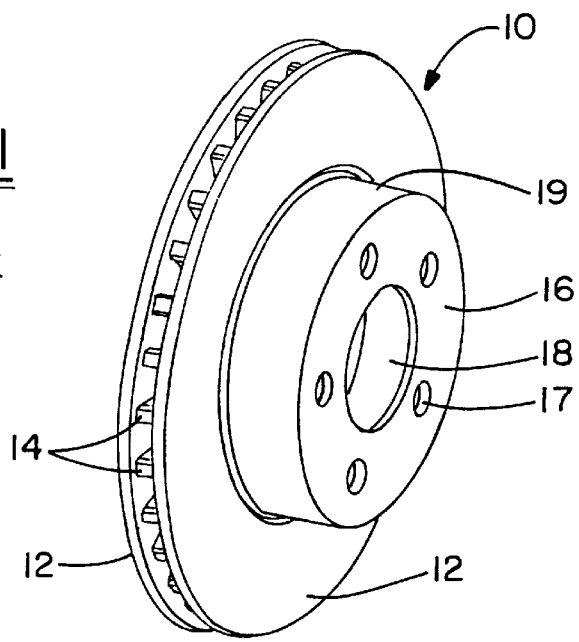
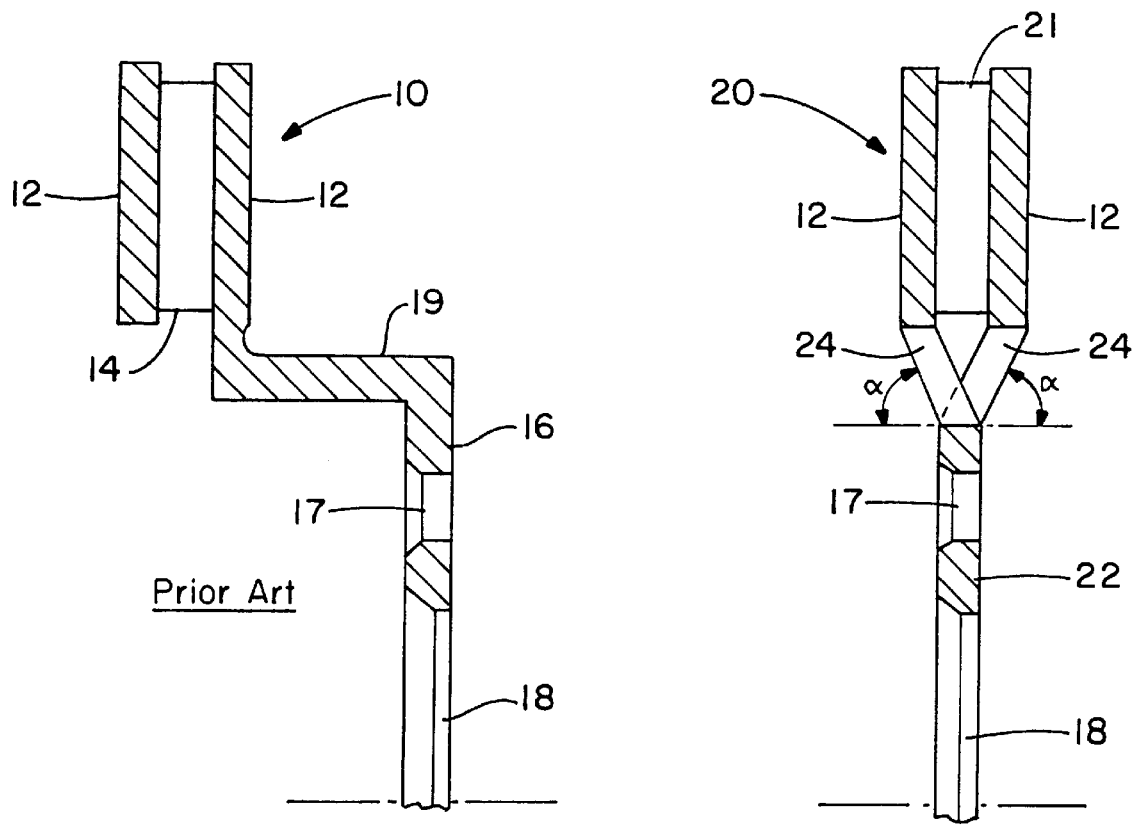

DUAL WEB BRAKE ROTOR

The present invention relates to a disc brake rotor for motor vehicles. More particularly, the present invention relates to a dual web structural support for connecting the brake discs to the rotor hub and for forcing cooling air between the brake surfaces. The present invention also allows the brake rotor to be interchangeable and thus permits use of the brake rotor on either the left side or the right side of the motor vehicle.

BACKGROUND OF THE INVENTION

A conventional disc brake rotor of a motor vehicle typically includes two vertically parallel brake discs which are maintained in their parallel orientation by a plurality of radially extending ribs positioned between and connecting opposing surfaces of the brake discs. A conventional rotor also includes a vertical hub which at its outer edge has a horizontally oriented "closed" support structure that extends to the nearest brake disc, is joined to the same at its inner horizontal edge, and thereby supports the brake discs. The conventional rotor hub is provided with a number of equally spaced holes (typically four or five) that are arranged in a circular pattern and permit the brake rotor to be mounted to a rotatable axle flange via stud bolts and lug nuts. The brake rotor acts with brake calipers containing brake pads which are applied to the brake discs to stop rotation of a vehicle wheel which typically is also mounted to the axle flange on the outboard side of the brake rotor. When the brake calipers are activated and cause the brake pads to contact the brake discs, frictional thermal energy is produced and the brake discs as well as the other portions of the brake rotor become hot through absorption of some of the thermal energy.

Because the support structure of a conventional brake rotor is situated to just one side (normally the outboard side) of the two brake discs, air is blocked from flowing to the flange side of the brake rotor and cooling of the brake discs is prevented.

SUMMARY OF THE INVENTION

It is therefore an advantage of the present invention to provide a support structure on a disc brake rotor to allow for a cooler running rotor. This advantage is provided by a structure that creates a "fan like" condition and thereby induces air flow through the brake discs when the rotor is caused to rotate about its central axis. The structure which provides this advantage is a weblike structure comprised of a plurality of blades that generally extend radially outward from a flat annular hub positioned centrally within the rotor and that alternately are connected to each of a pair of brake discs at an inner circumferential the brake discs.

This advantage and other novel features of the present invention will become apparent in the following detailed description of the invention when considered in conjunction with the accompanying drawings.

BRIEF DESCRIPTION OF THE DRAWINGS

A better understanding of the present invention will be had when reference is made to the accompanying drawings, wherein identical parts are identified by identical reference numerals and wherein:

FIG. 1 is a perspective view of a conventional disc brake rotor;

FIG. 2 is a half cross-sectional view of the conventional disc brake rotor shown in FIG. 1;

FIG. 4 is a half cross-sectional view of the disc brake rotor of the present invention;

DETAILED DESCRIPTION OF THE PRESENT INVENTION

Figure 3:
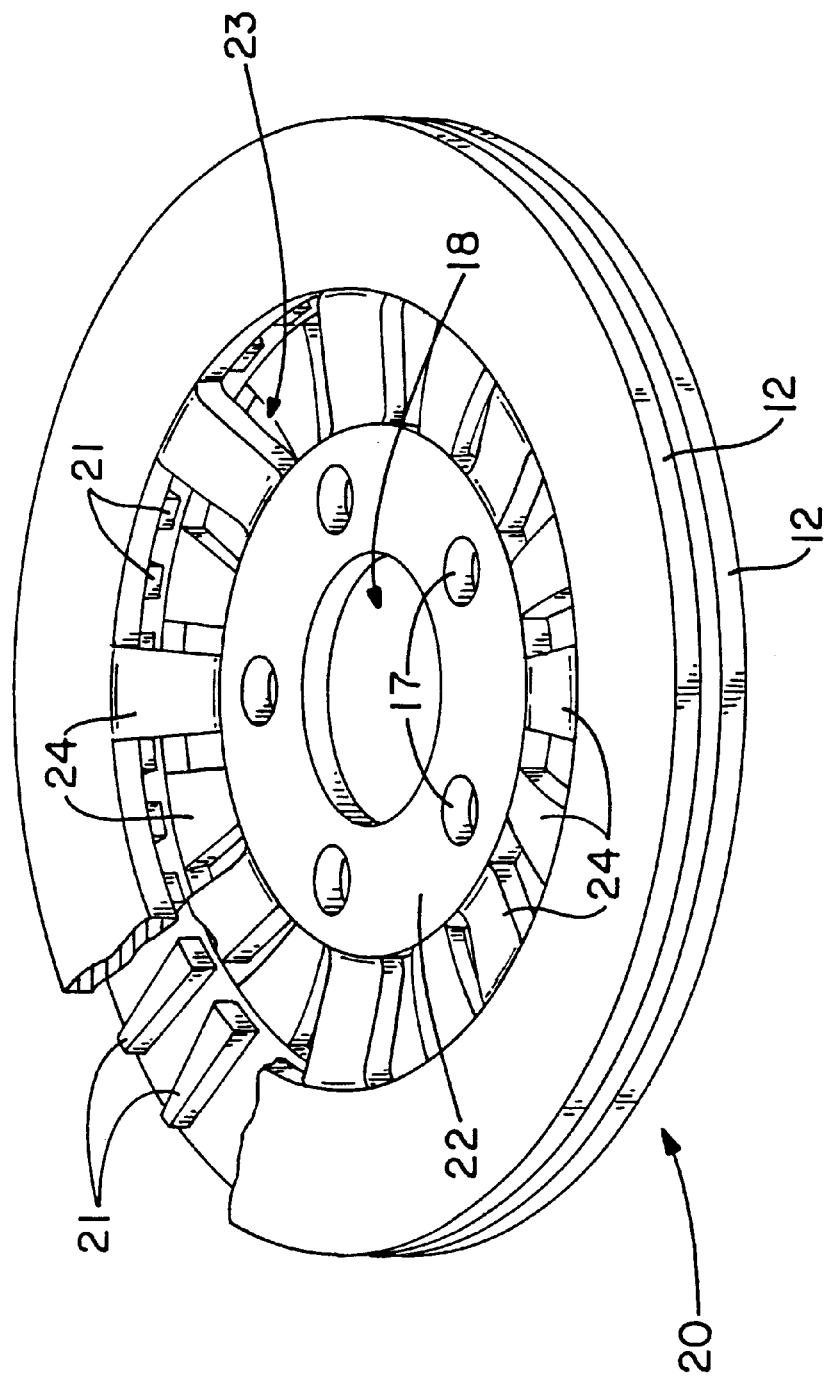
FIG. 3 is a perspective view of the disc brake rotor of the present invention.

FIG. 1 provides a perspective view of a conventional motor vehicle disc brake rotor 10. This view shows the outboard side of the rotor 10 as it would be seen on the axle of a motor vehicle. The disc brake rotor 10 generally includes a pair of annular brake discs 12 which are coaxially spaced apart from one another in a parallel orientation. The brake discs 12 are permanently retained in their parallel orientation by a plurality of radially extending ribs 14 that are located between and rigidly connecting opposing surfaces of the brake discs 12. The rotor 10 also includes a flat annular hub 16 that is concentrically aligned with and laterally offset to the outboard side of the brake discs 12 so that the hub 16 is also parallel with the brake discs 12. The hub 16 is provided with a plurality of holes 17 which are of the same diameter and which are arranged at equal intervals in a circular pattern. The hub 16 is also provided at its center with a single hole 18 having a diameter that is considerably larger than holes 17. A structure 19, which is cylindrical in form, is rigidly connected at one of its ends to the outermost edge of hub 16 and extends therefrom toward the nearer of the brake discs 12. The structure 19 is rigidly connected to the nearer brake disc 12 at its innermost edge and thus provides support for the assembly of the brake discs 12 and the ribs 14. The rotor 10 is mounted at the inboard side of the hub 16 to a rotatable axle flange (not shown) which has a plurality of stud bolts (also not shown) extending from the flange and through the holes 17. The axle flange typically is designed to fit within the structure 19 such that limited clearance is available between the innermost surface of the structure 19 and the outer edge of the axle flange.

As may be envisioned by reference to FIG. 2, when the rotor 10 is mounted to and rotated with the axle flange, the structure 19 prevents air from flowing from the outboard side (right side of FIG. 2) to the inboard side (left side of FIG. 2) of the rotor 10 and through the spaces formed by the ribs 14 and the inner surfaces of brake discs 12.

Attention is now directed to FIG. 3 which shows the rotor 20 of the present invention in a perspective view. The rotor 20 includes a pair of brake discs 12 arranged and connected by a plurality of ribs 21 in the same manner as the conventional rotor 10 described above and shown in FIGS. 1 and 2. In the preferred embodiment of the present invention, the ribs 21 are arranged between the discs 12 at equal circumferential intervals. (See FIGS. 3, 6 and 7.) Rotor 20 also has an annular hub 22 which is concentrically aligned with the brake discs 12 and which, rather than being offset to the outboard side of the brake discs 12 as in the case of the conventional rotor 10, is positioned centrally within the rotor 20 without lateral offset from the brake discs 12. The hub 22 of rotor 20 is provided with bolt holes 17 and center hole 18, all of which holes are arranged and located just as in conventional rotor 10.

Rotor 20 is provided with a weblike structure 23 that is comprised of a plurality of blades 24 that generally extend radially from the hub 22. The blades 24 are positioned at evenly-spaced intervals between the hub 22 and the assembly of the brake discs 12 and the ribs 21. All of the blades 24 are rigidly connected at one end to the outer circumferential edge of the hub 22. As may be clearly seen by reference to FIG. 4 where the rotor 20 is shown in a half cross-sectional view, the blades 24 are connected to the hub 22 so that they form an acute angle $\alpha$ with the outer circumferential edge of the hub 22 and extend to the brake discs 12. The blades 24 are also affixed to the hub 22 in an arrangement whereby they are alternatingly angled toward and connected at their opposite end to the inner circumferential edge of one of the brake discs 12.

The weblike structure 23 with the blades 24 arranged to connect the hub 22 to the brake discs 12 in the manner just described functions not only to provide support for the assembly of the brake discs 12 and ribs 21, but also to allow cooling air to flow through the spaces formed by the ribs 21 and the inner surfaces of the brake discs 12. Where the structure 23 is provided with blades 24 that have a uniform cross section from leading to trailing edge, the rotor 20 may be interchangeably used on either the right side or the left side of the motor vehicle without causing any diminution of the flow of cooling air.

Figure 5:
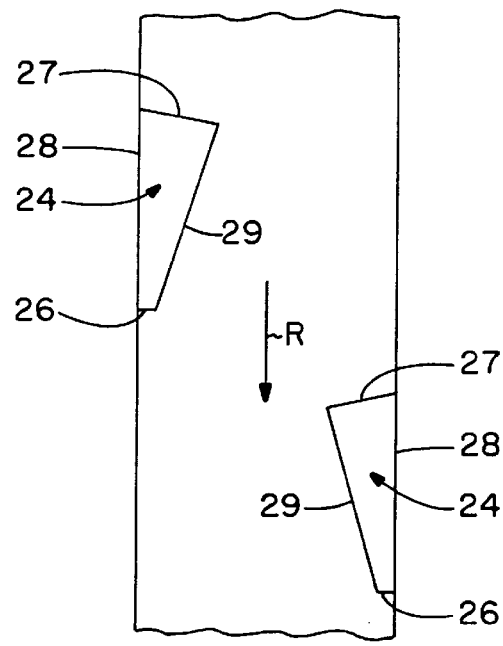
FIG. 5 is top cross-sectional view of two adjacently positioned blades in a preferred embodiment of the disc brake rotor of the present invention.

In order to enhance the flow of air through the rotor 20, and hence the cooling effect upon the brake discs 12, the blades 24 may be provided with a wedge-like cross section, and the ribs 21 may be provided with a form that causes the spaces between the brake discs 12 to have an opening at the inner diameter of discs 12 that is smaller than at the outer diameter of the discs 12. As may be seen by reference to FIG. 5, which shows a top cross-sectional view of two adjacently positioned blades 24 as they would appear at or near the location where they are joined to the brake discs 12, each of the blades 24 are provided with a narrow leading edge 26 that is oriented toward the direction of rotation of the rotor 20 (indicated by the bold arrow and the letter "R" in FIG. 5) and a trailing edge 27 that is oriented opposite the direction of rotation of the rotor 20. Additionally, each of the blades 24 has a face 28 and a face 29 that generally oppose one another and extend between the leading edge 26 and the trailing edge 27. As also shown by FIG. 5, the face 29 is acutely angled with respect to face 28 such that the thickness of the blade 24 increases progressively along its length from the leading edge 26 to the trailing edge 27. When rotor 20 rotates as indicated in FIG. 5, the wedge-like blades 24 create a fanning effect that draws a flow of air that first passes into the blades 24 from the region closest to the hub 22 and then radially outward through the spaces formed by the ribs 21 and the inner surfaces of the brake discs 12.

Figure 6:
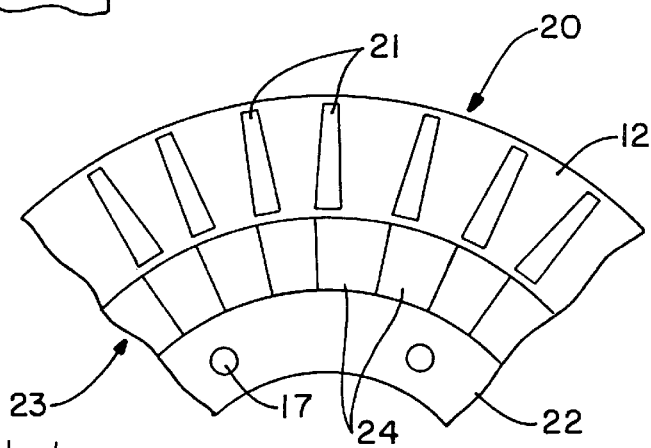
FIG. 6 is a partial sectional side view of the disc brake rotor of the present invention.

The outward flow of air through the spaces is further promoted by the shape of the ribs 21. FIG. 6, a sectional side view of the rotor 20, shows the ribs 21 having a width that progressively narrows in the radial direction from the inner diameter to the outer diameter of the disc 12. Narrowing of the ribs 21 as shown results in a corresponding widening of the spaces between the ribs 21, and thus each of the spaces has an opening at the inner diameter of the disc 12 that is considerably smaller in cross-sectional area than the opening at the outer diameter of the disc 12. The difference between the inner and outer diameter opening sizes and the gradually increasing cross-sectional area experienced within each space act to create a pressure drop that in turn induces air flow through the spaces in the outward radial direction.

Figure 7:
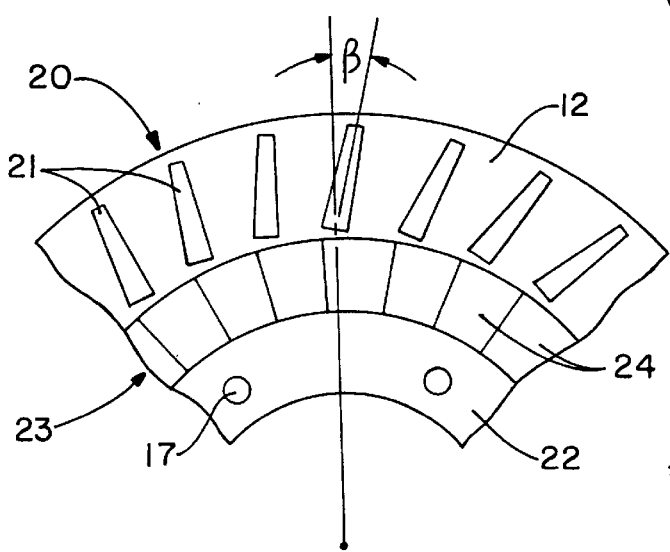
FIG. 7 is a partial sectional side view of a second embodiment of the disc brake rotor of the present invention.

As also shown in FIG. 6, the ribs 21 may be placed between the brake discs 12 so that the longitudinal axes of the ribs 21 are aligned in a perfectly radial direction. Alternatively, as shown in FIG. 7, the ribs 21 may be oriented between the brake discs so that the longitudinal axes are skewed at an angle $\beta$ relative to the radial direction.

When the rotor 20, is provided with structure 23 having the wedge-like blades 24 as shown in FIG. 5, it will be noted that the rotor 20 becomes directional in character, and hence is not capable of interchangeable use from the right side to the left side of the vehicle.

The disc brake rotor 20 of the present invention, having the weblike structure 23 with the blades 24 and the hub 22 positioned centrally within the rotor 20 without lateral offset provides a cooler running rotor that allows the possibility for reduced rotor weight, longer rotor life and overall improvement in brake performance.

Although the present invention has been described above in detail, the same is by way of illustration and example only and is not to be taken as a limitation on the present invention. Accordingly, the scope and content of the present invention are to be defined only by the terms of the appended claims.

What is claimed is:

1. A disc brake rotor for mounting to a rotatable axle flange of a motor vehicle and for inducing a flow of cooling air into the rotor, the rotor comprising:

a pair of annular brake discs which are coaxially spaced apart from one another in a parallel orientation and which have equivalent outside and inside diameters;

a plurality of substantially radially extending ribs, the ribs being located between and rigidly connecting an opposing surface of each disc included in the pair of annular brake discs and thereby forming an assembly of the pair of brake discs and the plurality of ribs, the ribs further being shaped to have a circumferential width that progressively narrows in the radial direction from the inside diameter to the outside diameter of the pair of brake discs, thereby defining a plurality of spaces located between the pair of brake discs, each of the spaces having a first opening at the inside diameter of the pair of brake discs and a second opening at the outside diameter of the pair of brake discs, the first opening having a cross-sectional area that is smaller than the cross-sectional area of the second opening;

a flat annular hub which has an outside diameter that is substantially smaller than the inside diameter of the pair of brake discs and which is concentrically aligned with the pair of brake discs and is axially positioned centrally within the assembly of the pair of brake discs and the plurality of ribs; and a weblike structure placed between and connecting the annular hub to the assemblage of the pair of brake discs and the plurality of ribs.

2. A disc brake rotor as claimed in claim 1, wherein the weblike structure is comprised of a plurality of blades that are substantially plate-like and that extend radially from an outer circumferential edge of the annular hub to the assembly of the pair of brake discs and the plurality of ribs.

3. A disc brake rotor as claimed in claim 2, wherein the plurality of blades extends from the annular hub in an arrangement so that each successive blade is alternately acutely angled toward and connected at its opposite end to the assemblage of the pair of brake discs and the plurality of ribs at an inner circumferential edge of one brake disc included in the pair of annular brake discs.

4. A disc brake rotor as claimed in claim 2, wherein each blade of the plurality of blades has a uniform circumferential cross section from a leading edge to a trailing edge of each blade, thereby permitting the brake rotor to be interchangeably used on the axle flange located on either a left side or a right side of the motor vehicle.

5. A disc brake rotor as claimed in claim 2, wherein each blade of the plurality of blades has a wedge-like circumferential cross section that is defined by a narrow leading edge oriented toward the direction of rotation of the brake rotor, a trailing edge dimensionally wider than the leading edge and oriented opposite to the direction of rotation of the brake rotor and a first lateral face and a second lateral face that generally oppose one another and extend between the leading edge and the trailing edge, the cross section creating a fanning effect to draw a flow of air into the brake rotor.

6. A disc brake rotor as claimed in claim 1, wherein each rib included in the assembly of the pair of brake discs and the plurality of ribs is placed between the pair of brake discs so that the longitudinal axis of each rib is aligned with a radial line passing through the central axis of rotation of the disc brake rotor.

7. A disc brake rotor as claimed in claim 1, wherein each rib included in the assemblage of the pair of brake discs and the plurality of ribs is placed between the pair of brake discs so that the longitudinal axis of each rib is skewed at an acute angle to a radial line passing through the central axis of rotation of the disc brake rotor.

8. A disc brake rotor as claimed in claim 1, wherein the plurality of ribs are circumferentially arranged between the pair of brake discs so that the plurality of spaces defined by the brake discs and the ribs is a plurality of uniform spaces.

* * * * *